United States Patent
Schroeder et al.

(10) Patent No.: US 8,305,650 B2
(45) Date of Patent: Nov. 6, 2012

(54) IMAGE TO TARGET COMPARATOR SOFTWARE

(75) Inventors: Darren Scott Schroeder, Hot Springs, AR (US); James Christopher Charles Huebsch, Little Rock, AR (US)

(73) Assignee: Xerox Corporation, Norwalk, CT (US)

( * ) Notice: Subject to any disclaimer, the term of this patent is extended or adjusted under 35 U.S.C. 154(b) by 228 days.

(21) Appl. No.: 12/947,168

(22) Filed: Nov. 16, 2010

(65) Prior Publication Data

US 2012/0120455 A1   May 17, 2012

(51) Int. Cl.
*H04N 1/40* (2006.01)

(52) U.S. Cl. ........ 358/448; 358/1.9; 358/1.18; 382/199; 382/298

(58) Field of Classification Search .................. 358/448, 358/1.9, 1.18, 3.28, 537; 382/199, 298
See application file for complete search history.

(56) References Cited

U.S. PATENT DOCUMENTS

| | | | |
|---|---|---|---|
| 5,097,518 A * | 3/1992 | Scott et al. | 382/298 |
| 5,461,462 A * | 10/1995 | Nakane et al. | 399/15 |
| 6,072,889 A | 6/2000 | Deaett et al. | |
| 2007/0162194 A1 * | 7/2007 | Garceau et al. | 701/3 |
| 2007/0229866 A1 * | 10/2007 | Dai et al. | 358/1.9 |
| 2010/0098338 A1 * | 4/2010 | Kido | 382/199 |
| 2010/0321713 A1 * | 12/2010 | Nishikawa | 358/1.9 |

* cited by examiner

*Primary Examiner* — King Poon
*Assistant Examiner* — Allen H Nguyen
(74) *Attorney, Agent, or Firm* — Hoffmann & Baron, LLP

(57) ABSTRACT

A system, method, and machine-readable storage medium for detecting changes in images are provided herein. The system includes an original grid and an image detection software program. The original grid represents an original image. The image detection software program detects changes between the original image and the processed image as follows: receiving a description of the original grid, the processed image and a set of tolerance parameters; scanning horizontally the pixels of the processed image into horizontal runs, scanning vertically the pixels of the processed image into vertical runs, and saving each of the plurality of vertical and horizontal coordinates within the predefined vertical and horizontal tolerance; determining a plurality of processed intersection coordinates; comparing a portion of the plurality of processed intersection coordinates to a portion of the plurality of original grid line intersection coordinates; and providing an image comparison result.

28 Claims, 11 Drawing Sheets

IMAGE TO TARGET COMPARATOR SOFTWARE

FIELD OF THE INVENTION

A system, method, and machine-readable medium for detecting changes in an original image after the original image is processed using an imaging process. In particular, providing an automatic detection of changes between a scan target of known makeup and a processed image.

BACKGROUND

During a typical imaging workflow process, pages are scanned, morphologically enhanced, assigned textual metadata, and converted to a customer specific deliverable file format and given to the client. At any time during the imaging workflow process, images can be modified on purpose or inadvertently by the scan hardware or people working with the images using a variety of software packages. For architectural and engineering drawings it is critical that the scale of the drawings are maintained in the capture process and discrepancies must be detected. If not detected, the discrepancies in the images, which may include for example scale accuracy, could cost tens to hundreds of thousands of dollars to correct. For example, if an original image is a blue print, the processed image could be scaled too small or too large, resulting in the builder building a wall in the wrong place. Moreover, the business unit performing the image processing could be held accountable due to inaccuracies of the image.

Previous methods of detecting discrepancies in images relied on a manual process. The previous methods trusted the accuracy of scan hardware and training of operators to ensure that inaccuracies would not take place. Thus, it is desirable to provide an automated quality assurance process that automatically detects discrepancies between an original image and a processed image to ensure consistent quality and reduce costs by reducing manual labor inspection of images.

SUMMARY

According to aspects illustrated herein, there is provided a system for detecting changes in images. The system includes an original grid and an image detection software program. The original grid represents the original image. The image detection software program is connectable to the image processing device and detects changes between the original image and the processed image as follows. The image detection software program first receives a description of the original grid. The description including a plurality of original grid line intersection coordinates associated therewith. Next, the image detection software program receives the processed image and a set of tolerance parameters associated therewith. The processed image being represented as pixels, and the set of tolerance parameters including a predefined vertical tolerance and a predefined horizontal tolerance. After that, the image detection software program scans horizontally the pixels of the processed image into horizontal runs, with the horizontal runs determining a plurality of vertical coordinates of the processed image and each of the plurality of vertical coordinates within the predefined vertical tolerance are saved. The image detection software program similarly scans vertically the pixels of the processed image into vertical runs, with the vertical runs determining a plurality of horizontal coordinates of the processed image and each of the horizontal coordinates within the predefined horizontal tolerance are saved. Subsequently, the image detection software program determines a plurality of processed intersection coordinates. The plurality of processed intersection coordinates being determined by calculating the intersections of each of the saved plurality of horizontal and vertical coordinates. Then, the image detection software program, compares a portion of the plurality of processed intersection coordinates to a portion of the plurality of original grid line intersection coordinates, and provides an image comparison result of the comparison of the plurality of processed intersection coordinates and the plurality of original grid line intersection coordinates.

According to other aspects illustrated herein, there is provided a method for detecting changes in images. The method includes receiving, with a computing device, a description of an original grid representing an original image. The description including a plurality of original grid line intersection coordinates associated therewith. The method also receives, with the computing device, a processed image and a set of tolerance parameters associated therewith. The processed image being represented as pixels and the set of tolerance parameters including a predefined vertical tolerance and a predefined horizontal tolerance. The method next scans horizontally the pixels of the processed image into horizontal runs. The horizontal runs determining a plurality of vertical coordinates of the processed image and each of the plurality of vertical coordinates within the predefined vertical tolerance are saved. The method continues scanning vertically the pixels of the processed image into vertical runs. The vertical runs determining a plurality of horizontal coordinates of the processed image and each of the horizontal coordinates within the predefined horizontal tolerance are saved. After that, the method determines a plurality of processed intersection coordinates. The plurality of processed intersection coordinates being determined by calculating the intersections of each of the saved plurality of horizontal and vertical coordinates. Then, the method compares a portion of the plurality of processed intersection coordinates to a portion of the plurality of original grid line intersection coordinates, and provides an image comparison result of the comparison of the plurality of processed intersection coordinates and the plurality of original grid line intersection coordinates.

According to further aspects illustrated herein, there is provided a machine-readable storage medium having operational instructions that, when executed by a processor, cause the processor to do the following. Receive a description of an original grid representing an original image. The description including a plurality of original grid line intersection coordinates associated therewith. Receive a processed image and a set of tolerance parameters associated therewith. The processed image being represented as pixels and the set of tolerance parameters including a predefined vertical tolerance and a predefined horizontal tolerance. Scan horizontally the pixels of the processed image into horizontal runs. The horizontal runs determining a plurality of vertical coordinates of the processed image and saving each of the plurality of vertical coordinates within the predefined vertical tolerance. Scan vertically the pixels of the processed image into vertical runs. The vertical runs determining a plurality of horizontal coordinates of the processed image and saving each of the horizontal coordinates within the predefined horizontal tolerance. Determine a plurality of processed intersection coordinates. The plurality of processed intersection coordinates being determined by calculating the intersections of each of the saved plurality of horizontal and vertical coordinates. Compare a portion of the plurality of processed intersection coordinates to a portion of the plurality of original grid line intersection coordinates. Provide an image comparison result of the comparison of the plurality of processed intersection coordinates and the plurality of original grid line intersection coordinates.

BRIEF DESCRIPTION OF DRAWINGS

Like reference symbols in the various drawings indicate like elements.

DETAILED DESCRIPTION

Figure 1:
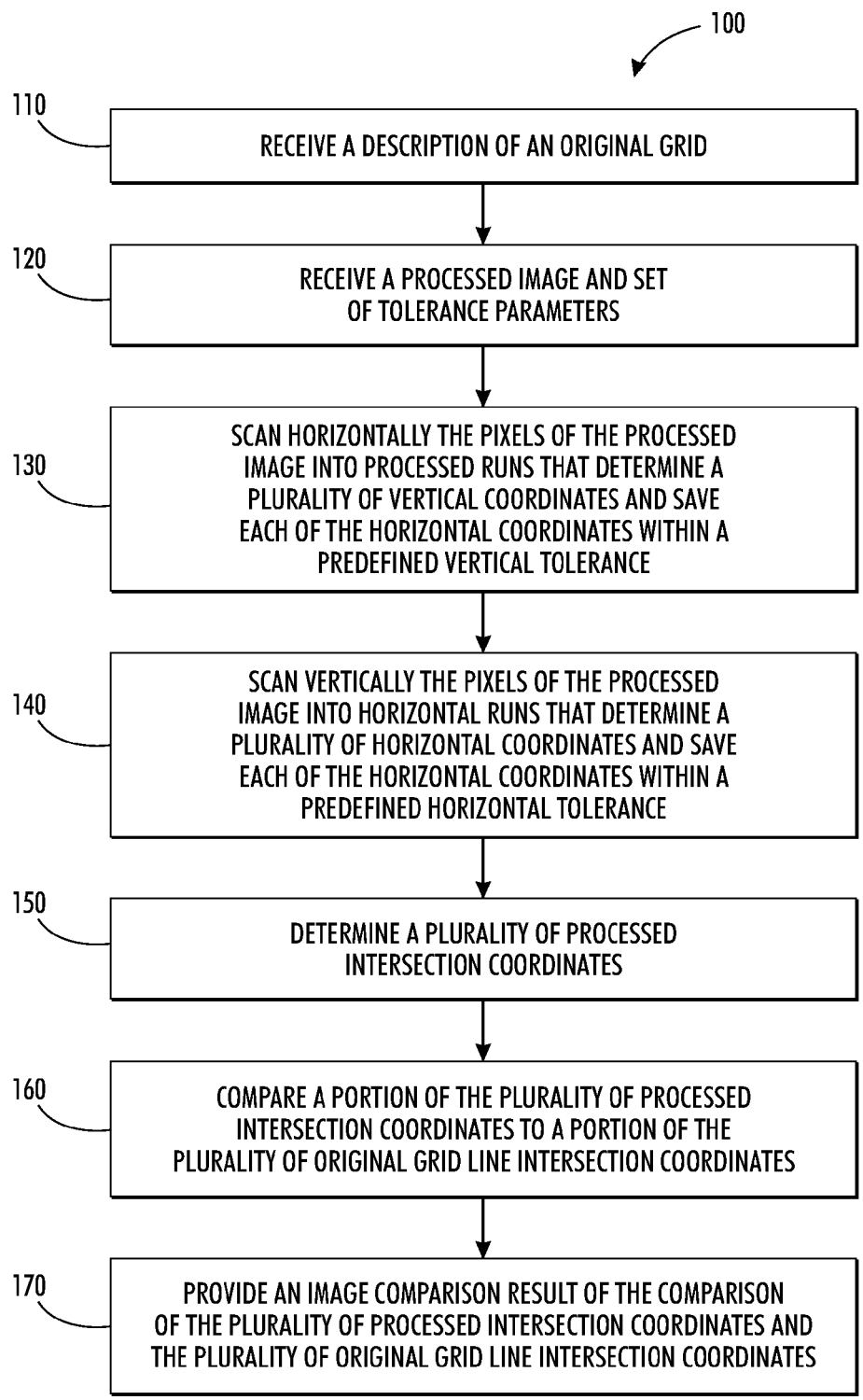
FIG. 1 provides a method for automatically detecting changes in images.

A system, method, and machine-readable storage medium for automatically detecting changes in images after image processing has occurred are provided herein.

As used herein, the term "image processing device" refers to a printmaking device or any apparatus, such as a digital copier, a bookmaking machine, a facsimile machine, a multifunction machine, a flatbed scanner, and a wide format scanner, which use marking technologies to perform a scanning or printing outputting function for any purpose. Examples of devices using marking technologies include xerographic, inkjet, and offset marking. The printmaking devices may scan digital files and/or pre-printed sheets. The printmaking devices may also feed blank or pre-printed sheets into devices that use marking technologies, but the printmaking device may not do any printing. The printmaking device may further be configured to perform processing on the scanned or fed sheets to reduce/enlarge images, convert file types, and/or duplicate or alter images.

As used herein, the term "image detection software program" refers to a sequence of instructions written for a computer to perform the specified task of detecting changes between an original image and a processed image. The instructions may be executed by a processing device (i.e., a processor) and stored on a storage device (e.g., hard drive, compact disc, USB flash drive).

As used herein, the phrase "original image" refers to an original version of an image prior to any image processing being performed. For example, image processing may include reducing and/or enlarging the size of the image and/or converting the image to a different file format.

As used herein, the phrase "processed image" refers to an image that is modified from the original image in any manner. The image may, for example, be modified by reducing or enlarging the size of the image and/or converting the file to a new file type. Such modifications may result in altering the image in unwanted ways, such as, the scaling, skew, and/or quality of the image.

As used herein, the term "grid" refers to fine lines that create a regular pattern of rectangles, such as squares. The lines forming the rectangles are referred to as grid lines. The grid lines may be printed on a sheet or be virtual lines used as a reference or guide.

As used herein, the term "pixel" (also known as picture element) refers to a single point in a raster image. The pixel may be arranged in a 2-D grid and may be represented by dots or squares.

As used herein, the phrase "intersection coordinate" refers to the x and y values for a point on an x-y axis, such as, an intersection of two lines and/or a location of a pixel.

As used herein, the phrase "horizontal coordinate" refers to an x-value for a point on an x-y axis.

As used herein, the phrase "vertical coordinate" refers to a y-value for a point on an x-y axis.

As used herein, the phrase "tolerance parameter" refers to a range of values that are acceptable deviations and/or variations from an exact value.

As used herein, the phrase "vertical tolerance" refers to a range of values that are acceptable deviations and/or variations from a y-value for a point on an x-y axis.

As used herein, the phrase "horizontal tolerance" refers to a range of values that are acceptable deviations and/or variations from an x-value for a point on an x-y axis.

As used herein, the phrase "outer rectangle" refers to the pixels (or plurality of intersection coordinates) forming the two vertical lines of the processed image having the smallest and largest x-value and the pixels (or plurality of intersection coordinates) forming the two horizontal lines of the processed image having the smallest and the largest y-value. The combinations of these lines should result in a set of pixels that will result in a rectangle when two vertical lines are drawn through the line of the smallest and largest x-values and two horizontal lines are drawn through the line of smallest and largest y-values.

FIG. 1 provides a method 100 for automatically detecting changes in images. The method 100 begins at reference 110 where the image software detection program may receive a description of an original grid representing an original image. The description of the original grid may include a plurality of original grid line intersection coordinates associated with the original grid. At reference 120, the image software detection program may receive a processed image and a set of tolerance parameters associated with the processed image. The processed image must be in an electronic form and may be represented as, for example, pixels. Pixels will be used herein; however as one skilled in the art will appreciate, the processed image may be represented in other electronic forms. The tolerance parameters may include a predefined vertical tolerance and a predefined horizontal tolerance.

The image software detection program, at reference 130, horizontally scans the pixels of the processed image into horizontal runs. The horizontal runs may determine a plurality of vertical coordinates of the processed image with each of the plurality of vertical coordinates within the predetermined vertical tolerance being saved to a database or other storage device, as one skilled in the art will appreciate. Similarly, at reference 140, the image software detection program vertically scans the pixels of the processed image into vertical runs. The vertical runs may determine a plurality of horizontal coordinates of the processed image with each of the plurality of horizontal coordinates within the predetermined vertical tolerance being saved to a database or other storage device, as one skilled in the art will appreciate.

Next, at reference 150, the image software detection program may determine a plurality of processed intersection coordinates. The plurality of processed intersection coordinates may be determined by calculating the intersections of each of the saved plurality of horizontal and vertical coordinates. Then, the image software detection program may compare a portion of the plurality of processed intersection coordinates to a portion of the plurality of original grid line intersection coordinates at reference 160. Finally, the image software detection program may provide an image comparison result at reference 170. The image comparison result is the result of the comparison of the plurality of processed intersection coordinates and the plurality of original grid line intersection coordinates.

The method 100 may further include calculating an outer rectangle representing the outer edges of the processed image using the image software detection program. The outer rectangle of the processed image may be determined using the plurality of processed intersection coordinates as follows: determining a first and a second edge of the process image outer rectangle using the plurality of processed intersection coordinates to select the processed intersection coordinates having the smallest and largest y-value coordinates to form the vertical edges of the outer rectangle; and determining a third and a fourth edge of the processed image outer rectangle using the plurality of processed intersection coordinates to select the processed intersection coordinates having the smallest and largest x-value coordinates to form the horizontal edges of the outer rectangle.

After the processed image outer rectangle is calculated, a variety of comparisons may be performed to detect errors. For example, the processed image outer rectangle may be compared to the original grid outer rectangle. Such comparison may be performed by comparing each of the plurality of processed intersection coordinates of the first and second edges of the processed image outer rectangle to the plurality of original grid line intersection coordinates forming the vertical edges of the original outer rectangle. Likewise, each of the plurality of processed intersection coordinates of the third and fourth edges of the processed image outer rectangle may be compared to the plurality of original grid line intersection coordinates forming horizontal edges of the original outer rectangle.

The calculation of the processed image outer rectangle and comparison of the outer rectangles may be performed prior to step 160, comparing the plurality of processed intersection coordinates to the plurality of original grid line intersection coordinates and/or prior to performing additional comparisons, some of which are illustrated below. By calculating the outer rectangle first, the algorithm may be able to determine that the data has too many errors, i.e., too many of the plurality of processed intersection coordinates are outside of the horizontal and/or vertical tolerance parameters. By determining there are too many errors initially, the image processing software does not have to do further comparisons of the processed image to the description of the original grid and may provide an indication and/or notification that the processed image has been modified beyond a tolerance parameter and stop the processing of the processed image.

The image detection software program may use the processed edges of the outer rectangle to compare the processed image outer rectangle to the original grid outer rectangle. First, each of the plurality of processed intersection coordinates of the first processed edge of the processed image outer rectangle may be compared to the plurality of original grid line intersection coordinates forming a first vertical edge of an original grid outer rectangle having the smallest y-value coordinates. After that, each of the plurality of processed intersection coordinates of the second processed edge of the processed image outer rectangle may be compared to the plurality of original grid line intersection coordinates forming a second vertical edge of the original grid outer rectangle having the largest y-value coordinates. Next, each of the plurality of processed intersection coordinates of the third processed edge of the processed image outer rectangle may be compared to the plurality of original grid line intersection coordinates forming a first horizontal edge of an original outer rectangle having the smallest x-value coordinates. Then, each of the plurality of processed intersection coordinates of the fourth processed edge of the processed image outer rectangle may be compared to the plurality of original grid line intersection coordinates forming a second horizontal edge of an original outer rectangle having the largest x-value coordinates. An outer rectangle result may then be determined based on the comparison values and the set of tolerance parameters.

The image detection software program may also use the processed edges of the outer rectangle to calculate lengths of one or more of the processed edges. The method 100 for determining the processed edges includes the following. First, calculating the length of one or more of the first processed edge of the processed image outer rectangle, the second processed edge of the processed image outer rectangle, the third processed edge of the processed image outer rectangle, and the fourth processed edge of the processed image outer rectangle. Next, comparing the calculated length of the one or more of the first processed edge of the processed image outer rectangle, the second processed edge of the processed image outer rectangle, the third processed edge of the processed image outer rectangle, and the fourth processed edge of the processed image outer rectangle to the description of one or more of a first vertical edge of an original grid outer rectangle having the smallest y-value coordinates, a second vertical edge of the original grid outer rectangle having the largest y-value coordinates, a first horizontal edge of an original outer rectangle having the smallest x-value coordinates, and a second horizontal edge of an original outer rectangle having the largest x-value coordinates corresponding to the calculated length of the one or more of the first processed edge of the processed image outer rectangle, the second processed edge of the processed image outer rectangle, the third processed edge of the processed image outer rectangle, and the fourth processed edge of the processed image outer rectangle. Then, determining an edge comparison result for each comparison of the calculated lengths based on the set of tolerance parameters.

The image detection software program may further use the processed edges of the outer rectangle to calculate a skew value for the processed image by comparing the processed intersection coordinates forming one or more of the edges of the processed image to the corresponding original grid line intersection coordinates. The image detection software program may calculate the skew of one or more of the first edge of the processed image outer rectangle; the second edge of the processed image outer rectangle; the third edge of the processed image outer rectangle; and the fourth edge of the processed image outer rectangle. A skew result for each of the calculated skew values may then be determined based on the set of tolerance parameters. As one skilled in the art will appreciate, the skew may be determined using any known method 100. The image detection software program may then provide skew result to the image processing device 220 or another device in the system 200.

The method 100 may further include evaluating the spacing between each of the plurality of processed intersection coordinates. The spacing may be evaluated by comparing the distance between each of the plurality of processed intersection coordinates to each of the plurality of original grid line intersection coordinates associated with the description of the original grid. The distances may then be used to determine spacing results for each comparison based on the set of tolerance parameters.

Prior to step 120, the method 100 receiving a processed image, the method 100 may include the step of scanning the processed image using a scanning device that may be connected to the image processing device. The scanned image may then be sent to the image detection software program. The tolerance parameters may then be determined based on the scanned image and/or a user input. Such user input may be received from one or more input devices. The input may include one or more of the description of the original grid, the processed image, and the set of tolerance parameters.

The method 100 may further include storing data transmitted between the image detection software 210 and the image processing device 220 in one or more memory devices. The data stored in the memory devices may include the description of the original grid, the processed image, a set of tolerance parameters including the predefined vertical tolerance parameters and the predefined horizontal tolerance parameters; a plurality of vertical coordinates of the processed image within the predefined vertical tolerance; a plurality of horizontal coordinates of the processed image within the predefined horizontal tolerance; a plurality of processed intersection coordinates; and a plurality of original grid line intersection coordinates. Furthermore, the following may also be stored in the one or more memory devices the first, second, third, and fourth edge comparison result; values of the first, second, third, and fourth edge; the length of the first, second, third, and fourth length; the plurality of processed intersection coordinates forming the processed image outer rectangle; the plurality of original grid line intersection coordinates forming the original grid outer rectangle; the first, second, third, and fourth skew of the processed image; the first, second, third, and fourth skew results; the vertical length result; the horizontal length result; the distances between each of the recorded vertical processed pixel coordinates; the distances between each of the recorded horizontal processed pixel coordinates; the vertical line spacing result; and the horizontal line spacing results.

The method 100 may include storing the set of tolerance parameters in a database or an electronic storage format, such as, an XML (Extensible Markup Language) file, a spread sheet, or a text file. The stored data may be accessible by the image detection software program. The method 100 may further include the step of creating a configuration file for storing the set of tolerance parameters and any additional information initially provided to the image detection software program and/or the image processing device.

Figure 2:
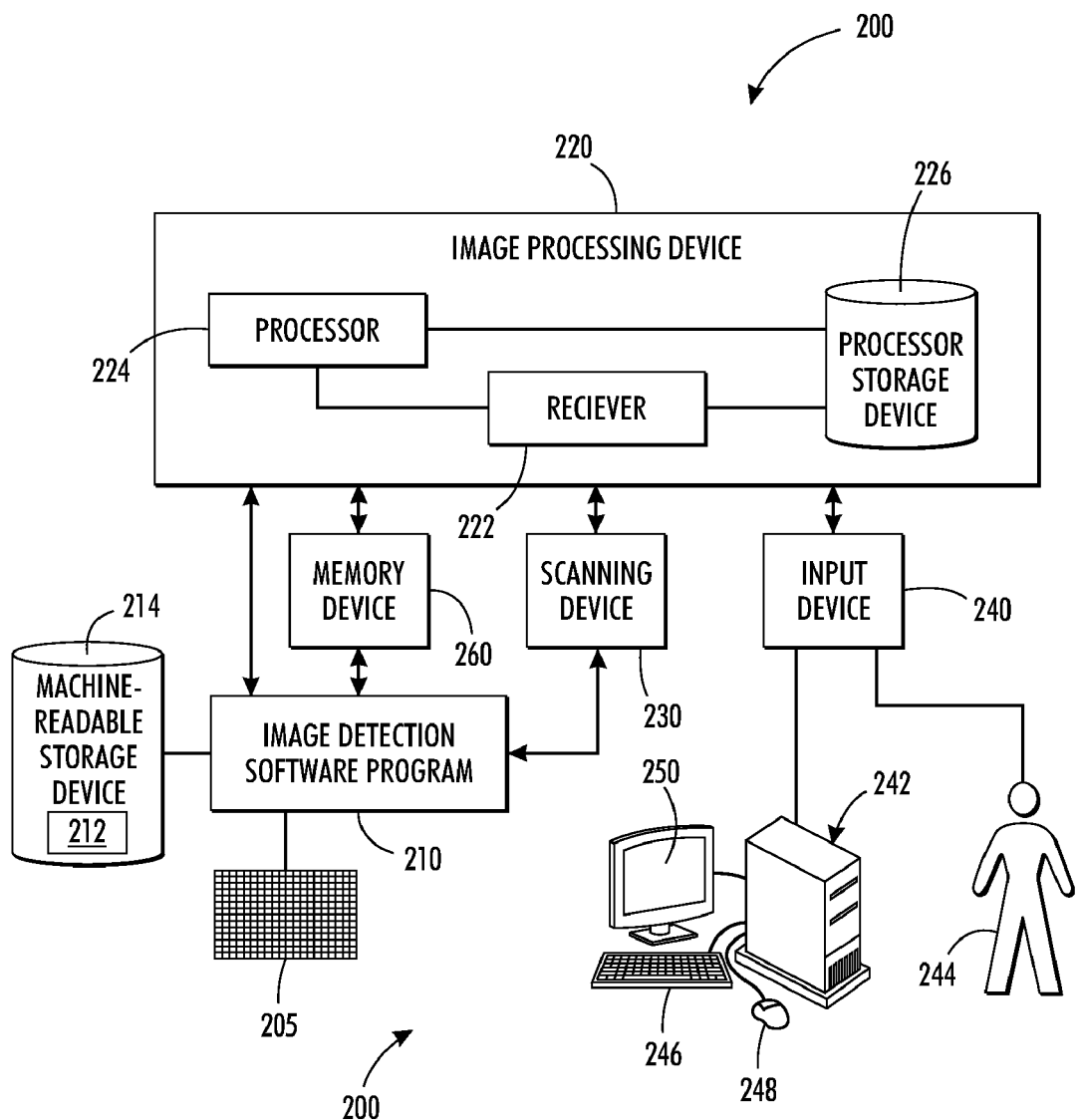
FIG. 2 provides a system for automatically detecting changes in images.

FIG. 2 provides a system 200 for use with the method 100 of FIG. 1. The system 200 includes an original grid 205 representing an original image and an image detection software program 210. The image detection software program 210 may be connectable to an image processing device 220. As one skilled in the art will appreciate, the image detection software program 210 may not be physically connected to the image processing device 220. In such cases, the data collected from the image processing device 220 may be stored in an electronic storage device, such as, a memory device 260, and transferred to the image detection software program 210 from the electronic storage device.

The image detection software program 210 may be configured to detect changes between an original image and a processed image. The image detection software program 210 is not limited to validating that scanners are performing optimally, but it allows the image to be checked at any point during or after image processing. Months or years later a target could be tested and compared to the original values to ensure manipulation has not occurred.

Moreover, the image detection software program 210 may detect the changes using a set of machine-readable instructions 212 stored on a machine-readable storage medium 214, such as a database, a hard drive, and/or a compact disc. The set of instructions 212 may instruct a processor 224 to execute the steps of the image detection software program 210 and cause the processor 224 to detect changes between the original image and the processed image as provided below.

The image detection software program 210 may be configured to detect changes between the original image and the processed image by performing the following operations. Receiving a description of the original grid. The description including a plurality of original grid line intersection coordinates. Receiving the processed image and set of tolerance parameters associated with the processed image. The processed image may be represented as pixels. The set of tolerance parameters may include a predefined vertical tolerance and a predefined horizontal tolerance. Scanning horizontally the pixels of said processed image into horizontal runs. The horizontal runs determining a plurality of vertical coordinates of the processed image and saving each of the plurality of vertical coordinates within the predefined vertical tolerance. Scanning vertically the pixels of the processed image into vertical runs. The vertical runs determining a plurality of horizontal coordinates of the processed image and saving each of the horizontal coordinates within the predefined horizontal tolerance. Determining a plurality of processed intersection coordinates. The plurality of processed intersection coordinates being determined by calculating the intersections of each of the saved plurality of horizontal and vertical coordinates. Comparing a portion of the plurality of processed intersection coordinates to a portion of the plurality of original grid line intersection coordinates. Providing an image comparison result of the comparison of the plurality of processed intersection coordinates and the plurality of original grid line intersection coordinates.

The comparison of a portion of the plurality of processed intersection coordinates to a portion of the plurality of original grid line intersection coordinates may include one or more comparisons. One or more of the comparisons may be performed at various times during the processing of the image and the comparisons may be performed multiple times.

For example, the image detection software program 210 may check the following one time during the processing of the processed image: the image dimensions (i.e., width, height, resolution); horizontal scale; vertical scale; and skew (i.e., top, left, bottom, right). The image detection software program 210 may further be configured to check the following ten (10) times for every inch of the image: vertical stretch or shrink; horizontal stretch or shrink; variance of the outer rectangle lines (i.e., top, bottom, left, right), such as bowing of one or more of the outer rectangle lines; cut off or folded corners; variable light or variable dark scans; and/or lone ranger stretch or shrink to only a portion of the image. As one skilled in the art will appreciate, the image detection software program 210 may perform the above mentioned checks and/or additional checks at varying times, which may be configurable by the operator of the software.

The image detection software program 210 may detect changes using a set of machine-readable instructions 212 to compare a portion of the plurality of processed intersection coordinates to a portion of the plurality of original grid line intersection coordinates by comparing the distance between each of the plurality of processed intersection coordinates to each of the plurality of original grid line intersection coordinates associated with the description of the original grid. The image detection software program 210 may then determine a spacing result for each comparison based on the set of tolerance parameters. The determination of the spacing result determines if the spacing is acceptable based on whether the distances between each of the plurality of processed intersection coordinates and each of the plurality of original grid line intersection coordinates are within a range of the corresponding tolerance parameter.

The image detection software program 210 may detect changes using a set of machine-readable instructions 212 to compare the edges of the processed image. The set of machine-readable instructions 212 may calculate a processed image outer rectangle representing the outer edges of the processed image. The processed image outer rectangle may be determined using the plurality of processed intersection coordinates to determine the edges of the processed image. Specifically, a first processed edge of the processed image outer rectangle may be determined using the plurality of processed intersection coordinates to select the processed intersection coordinates having the smallest y-value coordinates to form one of the vertical edges of the processed image outer rectangle. Next, a second processed edge of the processed image outer rectangle may be determined using the plurality of processed intersection coordinates to select the processed intersection coordinates having the largest y-value coordinates to form the other of the vertical edges of the processed image outer rectangle. After that, a third processed edge of the processed image outer rectangle may be determined using the plurality of processed intersection coordinates to select the processed intersection coordinates having the smallest x-value coordinates to form one of the horizontal edges of the processed image outer rectangle. Then, a fourth processed edge of the processed image outer rectangle may be determined using the plurality of processed intersection coordinates to select the processed intersection coordinates having the largest x-value coordinates to form the other of the horizontal edges of the processed image outer rectangle.

After the processed image outer rectangle may be calculated, the system 200 may perform a variety of comparisons to detect errors using the image detection software 210. For example, the processed image outer rectangle may be compared to the original grid outer rectangle. The outer rectangles may be compared by comparing each of the plurality of processed intersection coordinates of each of the edges of the processed image to the corresponding edge of the original grid. In particular, each of the plurality of processed intersection coordinates of the first processed edge of the processed image outer rectangle may be compared to the plurality of original grid line intersection coordinates forming a first vertical edge of an original grid outer rectangle having the smallest y-value coordinates. Next, each of the plurality of processed intersection coordinates of the second processed edge of the processed image outer rectangle may be compared to the plurality of original grid line intersection coordinates forming a second vertical edge of the original grid outer rectangle having the largest y-value coordinates. After that, each of the plurality of processed intersection coordinates of the third processed edge of the processed image outer rectangle may be compared to the plurality of original grid line intersection coordinates forming a first horizontal edge of an original outer rectangle having the smallest x-value coordinates. Then, each of the plurality of processed intersection coordinates of the fourth processed edge of the processed image outer rectangle may be compared to the plurality of original grid line intersection coordinates forming a second horizontal edge of an original outer rectangle having the largest x-value coordinates. Subsequent to that, an outer rectangle result may be determined for each of the comparisons based on the set of tolerance parameters.

The calculation of the processed image outer rectangle and comparison of the outer rectangles may be performed prior to comparing the plurality of processed intersection coordinates to the plurality of original grid line intersection coordinates and/or prior to performing additional comparisons, some of which are illustrated below. By calculating the outer rectangle first, the algorithm may be able to determine that the data has too many errors, i.e., too many of the plurality of processed intersection coordinates are outside of the horizontal and/or vertical tolerance parameters. By determining there are too many errors initially, the image processing software 210 does not have to do further comparison of the processed image to the description of the original grid and may provide an indication and/or notification that the processed image has been modified and stop the processing of the processed image.

An addition use for the determined edges of the outer rectangle includes using the image detection software program 210 to analyze one or more of the edges to determine if there are any skew errors. The skew errors may be identified by calculating a skew value for one or more of the first processed edge of the processed image outer rectangle, the second processed edge of the processed image outer rectangle, the third processed edge of the processed image outer rectangle, and the fourth processed edge of the processed image outer rectangle, and for each of the skew values calculated, determining a skew result based on the set of tolerance parameters.

The image detection software program 210 may further use the determined edges to calculate the length of one or more of the first processed edge of the processed image outer rectangle, the second processed edge of the processed image outer rectangle, the third processed edge of the processed image outer rectangle, and the fourth processed edge of the processed image outer rectangle. The calculated length of the one or more of the first processed edge of the processed image outer rectangle, the second processed edge of the processed image outer rectangle, the third processed edge of the processed image outer rectangle, and the fourth processed edge of the processed image outer rectangle may be compared to the description of one or more of a first vertical edge of an original grid outer rectangle having the smallest y-value coordinates, a second vertical edge of the original grid outer rectangle having the largest y-value coordinates, a first horizontal edge of an original outer rectangle having the smallest x-value coordinates, and a second horizontal edge of an original outer rectangle having the largest x-value coordinates corresponding to the calculated length of the one or more of the first processed edge of the processed image outer rectangle, the second processed edge of the processed image outer rectangle, the third processed edge of the processed image outer rectangle, and the fourth processed edge of the processed image outer rectangle. An edge comparison result for each comparison of the calculated lengths may be determined based on the set of tolerance parameters.

The image processing device 220 may further include a receiver 222, a processor 224, and a processor storage device 226. The receiver 222 may be configured to receive input from the image detection software program 210 and various input devices (as will be described below). The input received may be sent to the processor 224 and/or the processor storage device 226. The processor 224 may be configured to use the set of machine-readable instructions 212 to perform the tasks for detecting changes between the original image and the processed image. The processor storage device 226 is optional and may be configured to store one or more of the description of the description of the original grid, the processed image, the set of tolerance parameters, including predefined vertical tolerance parameters and predefined horizontal tolerance parameters; the plurality of vertical coordinates of the processed image within the predefined vertical tolerance, the plurality of horizontal coordinates of the processed image within the predefined horizontal tolerance, the plurality of processed intersection coordinates, and the plurality of original grid line intersection coordinates.

The system 200 may further include a scanning device 230 connectable to the image processing device 220. The scanning device 230 may be configured to scan the processed image and provide the processed image to the image detection software program 210 directly or through the image processing device 220.

The system 200 may further include an input device 240 for receiving input from a client device 242 and/or a user 244. The image processing device 220 receives input of one or more of the following: the description of the original grid; the processed image, and the set of tolerance parameters. The input may be prompted by specific questions generated by the image processing device 220 and/or a set of predetermined options (i.e., a drop down menu), and/or a device configured to send incoming electronic data for interpretation by the receiver 222 of the image processing device 220. The input device 240 may include, for example, a computer 242 with a graphical user interface (GUI) (not shown), a keyboard 246, a mouse 248, and/or a touch screen 250. The input device 240 may further include an input port (not shown), such as, a USB port for a USB hard drive, a serial port, a network port (i.e., an Ethernet port), and/or a connection port for other electronic devices, as one skilled in the art will appreciate.

The system 200 may further include one or more memory devices, shown as one memory device 260 configured to store data transmitted between the image detection software 210 and the image processing device 220. For example, the memory device 260 may be a database, a hard drive, or Random Access Memory (RAM). The memory devices may store the description of the original grid, the processed image, a set of tolerance parameters including the predefined vertical tolerance parameters and the predefined horizontal tolerance parameters; a plurality of vertical coordinates of the processed image within the predefined vertical tolerance; a plurality of horizontal coordinates of the processed image within the predefined horizontal tolerance; a plurality of processed intersection coordinates; and a plurality of original grid line intersection coordinates. Furthermore, the following may also be stored in the one or more memory devices the first, second, third, and fourth edge comparison result; values of the first, second, third, and fourth edge; the length of the first, second, third, and fourth length; the plurality of processed intersection coordinates forming the processed image outer rectangle; the plurality of original grid line intersection coordinates forming the original grid outer rectangle; the first, second, third, and fourth skew of the processed image; the first, second, third, and fourth skew results; the vertical length result; the horizontal length result; the distances between each of the recorded vertical processed pixel coordinates; the distances between each of the recorded horizontal processed pixel coordinates; the vertical line spacing result; and the horizontal line spacing results.

The set of tolerance parameters may be inputted to the image processing device 220 by the user 244 and/or image detection software program 210 (which calculates the set of tolerance parameters) or determined by the image processing device 220. When the set of tolerance parameters may be determined by the image processing device 220, the workflow may be modified during the initial deployment of the image detection software program 210 to call an algorithm with a set of "best guess" tolerances. For a period of time, the images may be processed with the "best guess" tolerances and statistics may be collected and stored in a database. Once a statistically significant amount of data is collected, then an evaluation of the captured data on the images may be reviewed for adjustments to the tolerance parameters. For example, the set of tolerance parameters may be determined by scanning an amount of the document which may be statistically significant. The results of the scanning may then be analyzed and the outlying samples may be thrown out. Then, the remaining sample values may be averaged and the set of tolerance parameters may be determined.

The set of tolerance parameters may, for example, be stored in a database or an electronic storage format, such as, an XML file, a spread sheet, or a text file for consumption as the image detection software program 210 runs and checks the image to register values against the set of tolerance parameters. These parameters, stored in the database or the electronic storage format, may be read by the comparator software. Specifically, the set of tolerance parameters may be stored in, for example, an XML file that may be accessible by the image detection software program 210 while the processed image is analyzed.

Additionally, the tolerance parameters stored in, for example, the XML file may be used as a configuration file that also stores one or more of the description of the original grid and the set of tolerance parameters, such as, the tolerance on the grid line width, grid spacing between grid lines, variance of the lines from nominal, line good/bad ratio, horizontal and vertical skew, and scaling percent. The configuration file may be accessed by the image detection software program 210 during analysis. The configuration file may be not read by the algorithm itself, but code calling the algorithm can configure it by calling the algorithm Application Programming Interface (API) after loading the XML file. The key is to define a tolerance for each parameter to indicate the proper range without making the parameter values too tight or too loose.

Figure 3:
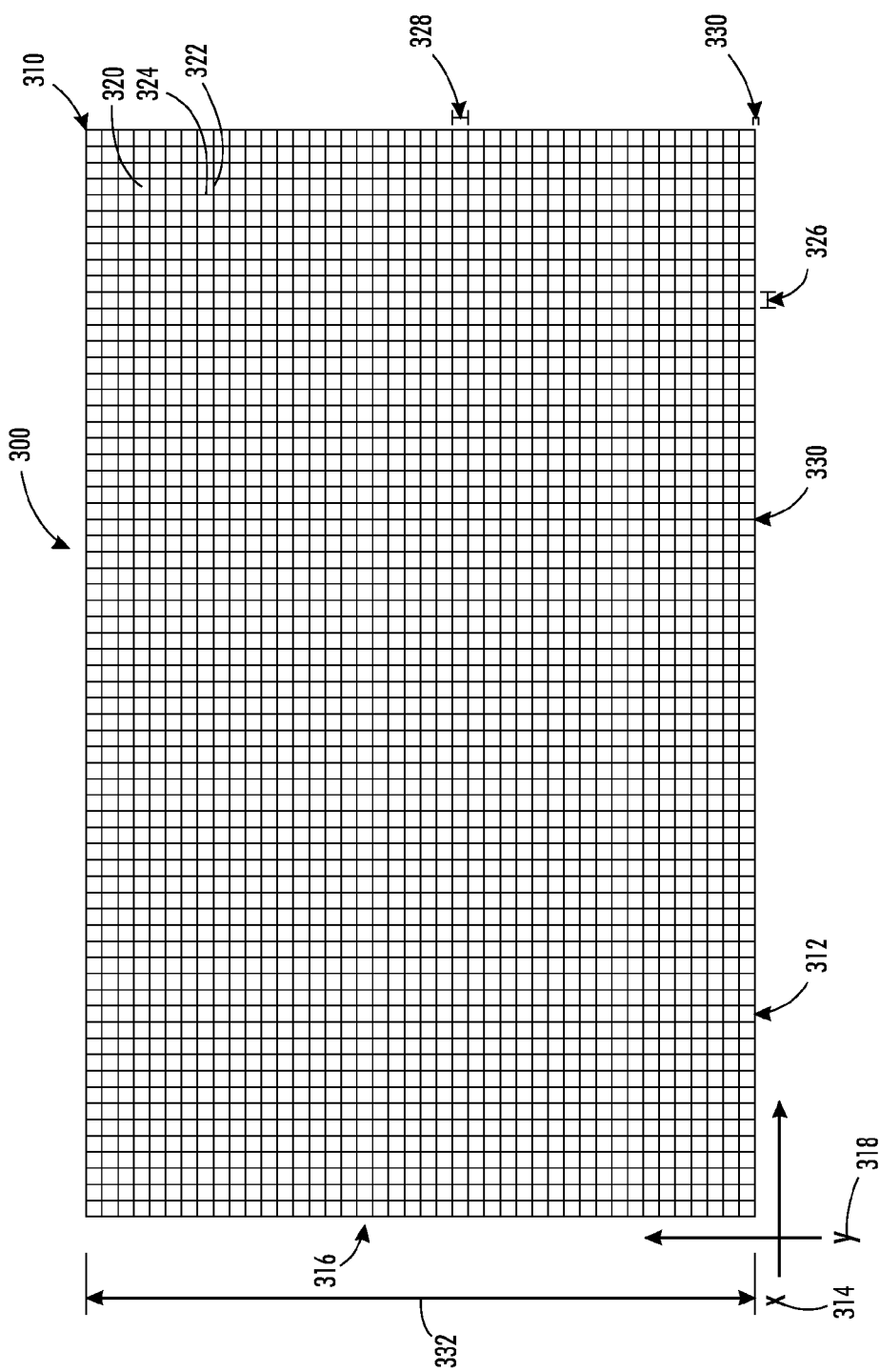
FIG. 3 provides an example target forming a grid for use with the method and system of FIGS. 1-2.

With reference to FIG. 3, an example target 300 is shown. The target 300 forms a grid 310 composed of horizontal lines 312 along the x-axis 314 and vertical lines 316 along the y-axis 318 of an x-y graph, for use with the method 100 and system 200 of FIGS. 1-2 above. The target 300 uses the notion of a perfect image based on a grid 310 of 12,880 one-quarter (¼) inch by one-quarter (¼) inch squares 320 precisely drawn on a D-size engineering drawing sheets (24 inch by 36 inch). Using a predefined target, such as the target 300 of FIG. 3, the image detection software program 210 knows before an image is scanned or processed every intersection of the lines 322, 324 that create these 12,880 squares 320. The image detection software program 210 also knows the exact square width 326 and square height 328 of these squares 320, and the line width 330 and the line height 332 of all lines used to create the squares 320.

With this knowledge in hand, the image detection software program 210 may inspect and/or analyze the processed intersection coordinates of the processed image at any step during image processing to identify distortions (or discrepancies) from the grid 310 within a predefined set of tolerance parameters. If any of the processed intersection coordinates exceed the range of one or more of the tolerance parameters, the image detection software program 210 may log an exception (i.e., providing a message to a user or administrator) and/or prevent the processing of the processed images identified as exceeding the tolerance range. For example, the distortions detected may include scaling errors, skew errors, and inconsistencies in image quality (e.g., lightness or darkness of the printing, missing portions in the processed image). FIGS. 5-12 below illustrate some examples of distortions between original images and processed images.

In operation, the system 200 may work in combination with the instructions stored on the machine-readable storage medium 214 and the method 100 to detect errors in an image during processing. The system 200 may use an original image, such as a sheet of engineering paper with a precisely drawn design. The image detection software program 210 may either receive electronically a description of the original grid or analyze the original image and to determine a description of the original grid. Using the description of the original grid, a precise target, such as the target 300 of FIG. 3, may be created by the image detection software program 210. The target 300 may then be precisely printed out on a scanning device 230, such as, an engineering width scanner at a set interval. The target 300 may then be analyzed against the processed image.

The system 200 may then analyze a processed image in comparison to the target 300. The analysis may begin with the image detection software program 210 comparing the processed image to the target 300 after the processed image is initially scanned and/or received by the image detection software program 210. The processed image may then be reduced/enlarged and/or modified in additional ways to accommodate the processing request. After that, additional processing, such as, image clean up (i.e., straightening the image, removing speckles from the image) may be performed.

The image detection software program 210 may also be used after the processed image is judged and/or modified manually (i.e., by an operator of an image processing device 220) since additional inadvertent distortions to the image may occur. The image detection software program 210 may be configured to detect such distortions. A final processing step may include changing the processed image into a different deliverable format (i.e., into a PDF document), which may also introduce distortions to the processed image. After any of the above processing steps occur, the image detection software program 210 may be run to detect modifications and/or distortions to the processed image. Specifically distortions that exceed the range of one or more of the tolerance parameters to the processed image as compared to the target 300.

Moreover, an optional addition to the system 200 would be to place a barcode on the target 300. The system 200 may be configured to scan the barcode prior to using the image detections software program 210. The barcode may be used to select the correct set of tolerance parameters for the target 300. In addition, each target 300 can have a barcode with a unique serial number for tracking the usage of the target 300 and detecting wear of the target 300. A barcode may also indicate that the current image has a grid that should be analyzed for distortion. For example, the original image, tolerance parameters, image parameters may be stored and accessible using a barcode in conjunction with a barcode reading software engine as the starting point for the analysis of the processed image. The image detection software program 210 may further be configured to utilize that barcode reading software engine (not shown) in an augmented fashion which enables quick image analysis.

Figure 4:
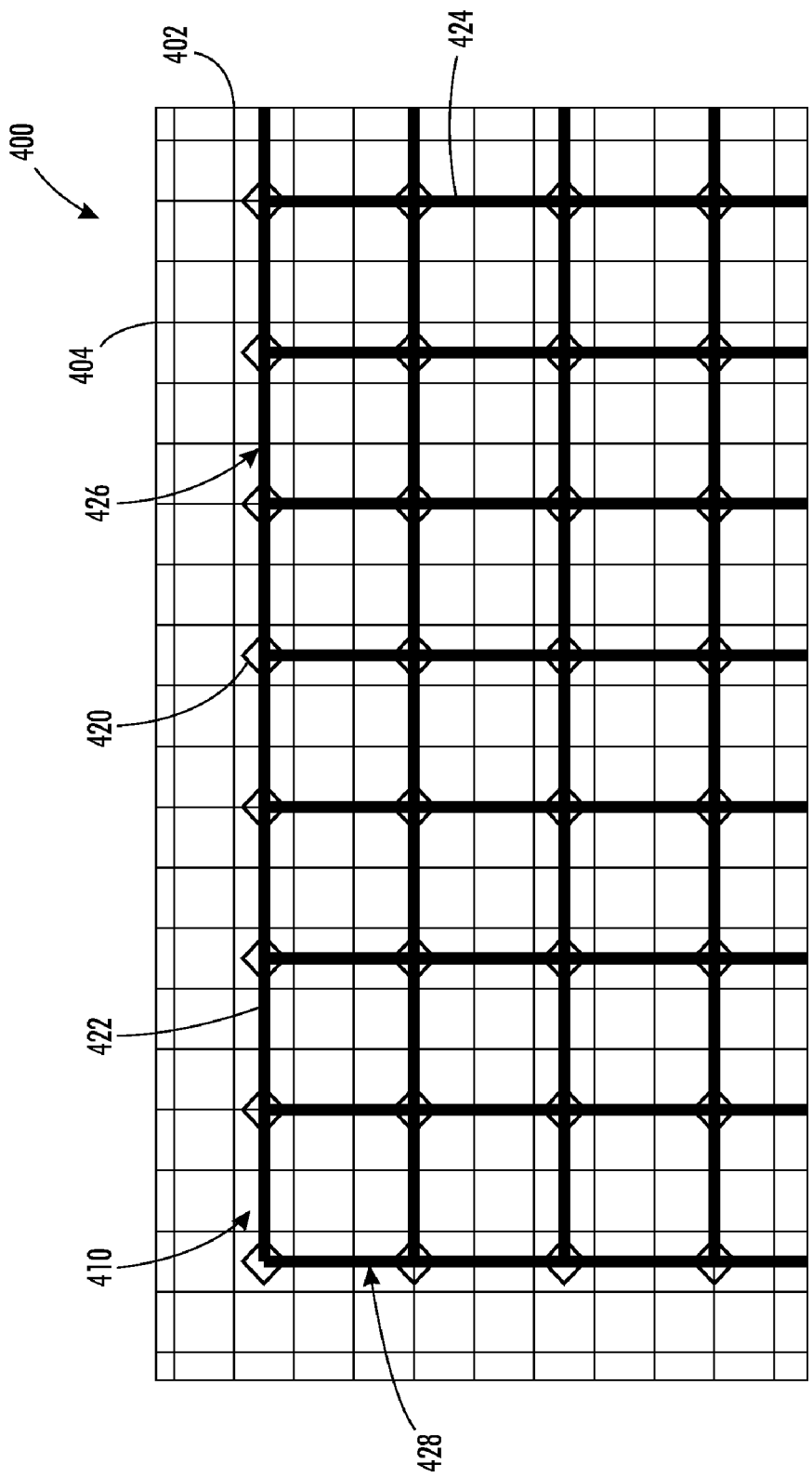
FIG. 4 provide an example of scan lines and pixel intersections for use with the method and system of FIGS. 1-2, using a square grid for the scan lines.

FIG. 4 provides an example of a grid 400 depicting the results of the horizontal and vertical runs as the horizontal scan lines 402 and vertical scan lines 404 run through the processed image 410. The intersection coordinates 420 of the horizontal 422 and vertical 424 grid lines are indicated by the image detection software program 210 and may be depicted, for example, as a diamond. Reference 426 shows one of the horizontal edges of an outer rectangle of the plurality of processed intersection coordinates 420, in particular, the horizontal edge with the largest y-values. Reference 428 shows one of the vertical edges of an outer rectangle of the plurality of processed intersection coordinates 420, in particular, the vertical edge with the smallest x-values.

FIGS. 5-12 below show the following distortions in a processed image: (1) vertical stretch errors; (2) horizontal stretch errors; (3) outer line variances; (4) skew error; (5) missing lines; (6) variable lightness of pixels; (7) variable darkness of pixels; and (8) missing portions of the original image. The examples may exaggerate the distortions in order to demonstrate the type of distortions the image detection software is capable of identifying. Thus, the actual distortions are usually less pronounced than the distortions provided herein. Moreover, the distortions shown below are only illustrations of the exemplary types of errors which the image detection software program 210 may detect. As one skilled in the art will appreciate, the image detection software program 210 may further be configured to detect additional types of processing distortions beyond what is shown below.

Figure 5:
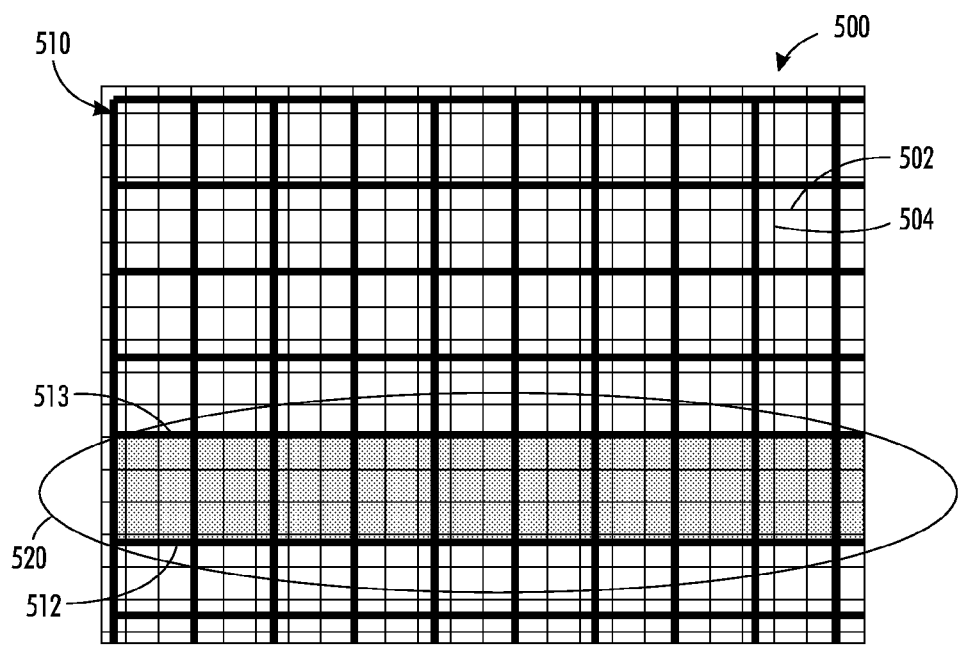
FIGS. 5-12 provide examples of the types of changes detected using the method and system of FIGS. 1-2.

With reference to FIG. 5 (500), a processed image 510 with horizontal scan lines 502 and vertical scan lines 504 is shown. The processed image 510 contains a vertical stretch error 520, indicating an improper distance between two of the horizontal lines 512, 513 of the processed image 510. As described above, the image detection software program 210 detects changes between the original image and the processed image 510 by comparing the vertical distance between each of the plurality of processed intersection coordinates and providing a vertical line spacing result for each comparison based on the set of tolerance parameters.

Figure 6:
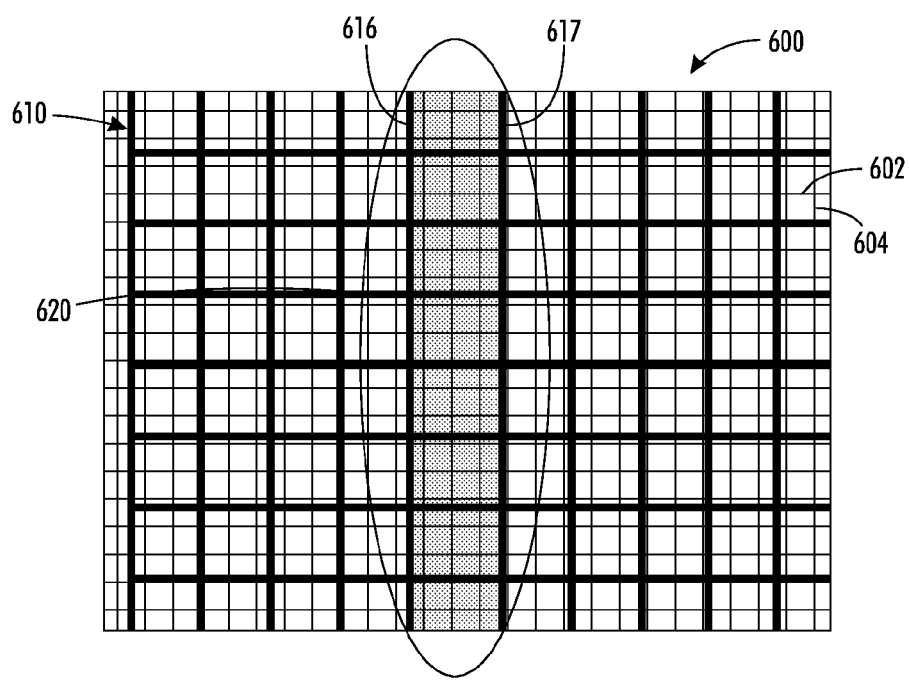

Similarly, FIG. 6 shows a processed image 610 with horizontal scan lines 602 and vertical scan lines 604. The processed image 610 contains a horizontal stretch error 620, indicating an improper distance between two of the vertical lines 616, 617 of the processed image 610. As described above, the image detection software program 210 detects changes between the original image and the processed image 610 by comparing the horizontal distance between each of the plurality of processed intersection coordinates and providing a horizontal line spacing result for each comparison based on the set of tolerance parameters.

Figure 7:
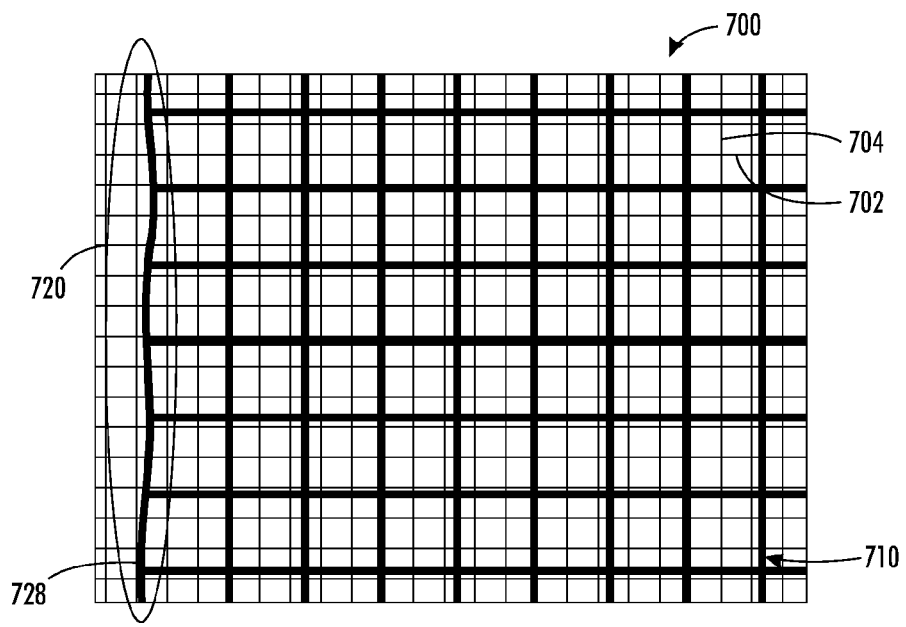

An outer line variance of the processed image 710 is shown in FIG. 7 (700) Using horizontal scan lines 702 and vertical scan lines 704, the outer line variance may be determined. For example, the image detection software program 210, may be configured to determine outer line variances by first calculating the outer rectangle of the processed image 710 and analyzing one or more of the four edges. As shown in FIG. 7 (700), the outer line variance is a wavy portion 720 of the one vertical edge 728; however, as one skilled in the art will appreciate, the outer line variance may be detected for any of the vertical or horizontal edges. The outer line variance error may not be detected using all types of analysis since portions of the vertical edge 728 are approximately at the correct position. However, the method 100, the image detection software program 210, and the set of machine-readable instructions 212 provided herein may be configured to detect the outer line variance error. The error may be detected when the distance between each of the plurality of processed intersection coordinates are compared to each of the plurality of original grid line intersection coordinates.

Figure 8:
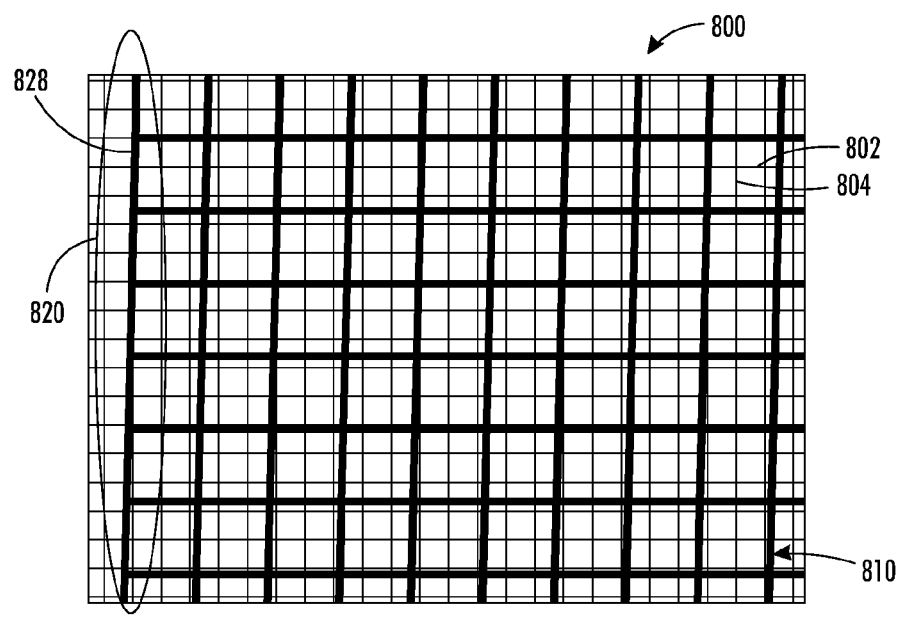

Likewise, the image detection software program 210 may also be configured to compare the processed image to the original image description to determine if there are any skew errors. FIG. 8 (800) shows the processed image 810 with horizontal scan lines 802 and vertical scan lines 804. In FIG. 8, a skew error 820 is detected on one of the vertical edges 828. The image detection software program 210 may determine skew errors by: calculating a first skew value of the first processed edge of the outer rectangle; calculating a second skew value of the second processed edge of the outer rectangle; calculating a third skew value of the third processed edge of the outer rectangle; and/or calculating a fourth skew value of the fourth processed edge of the outer rectangle. A skew result may then be determined for each of the calculated skew values based on the set of tolerance parameters. The skew result will indicate if a skew error is present in any of the edges of the processed image.

Figure 9:
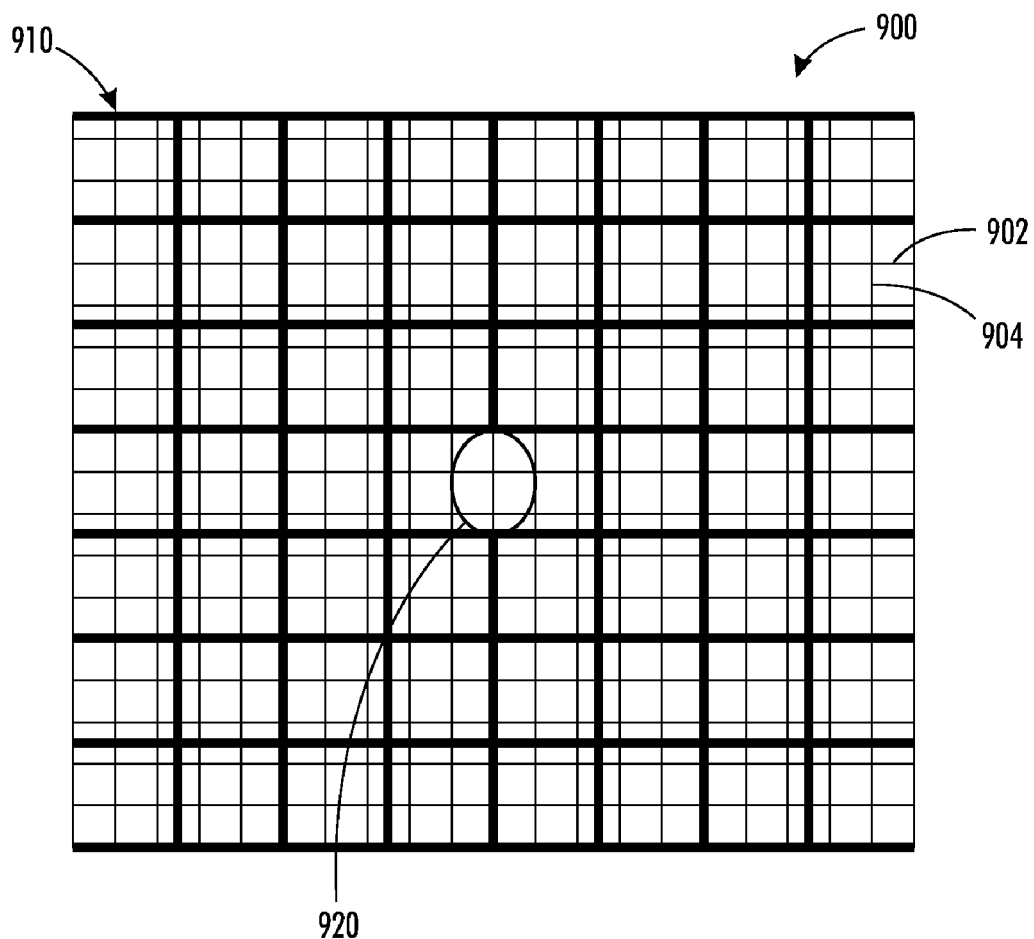

FIG. 9 (900) shows the processed image 910 with horizontal scan lines 902 and vertical scan lines 904. FIG. 9 shows the processed image 910 missing a portion of a vertical line 920. The method 100, the image detection software program 210, and the set of machine-readable instructions 212 disclosed herein may be configured to identify that the processed image 910 is missing a portion of the vertical line 920 by comparing the vertical distance between each of the plurality of intersection coordinates and providing a vertical line spacing result for each comparison based on the set of tolerance parameters. Likewise, the horizontal distances between each of the plurality of intersection coordinates may be compared to detect missing horizontal lines.

Figure 10:
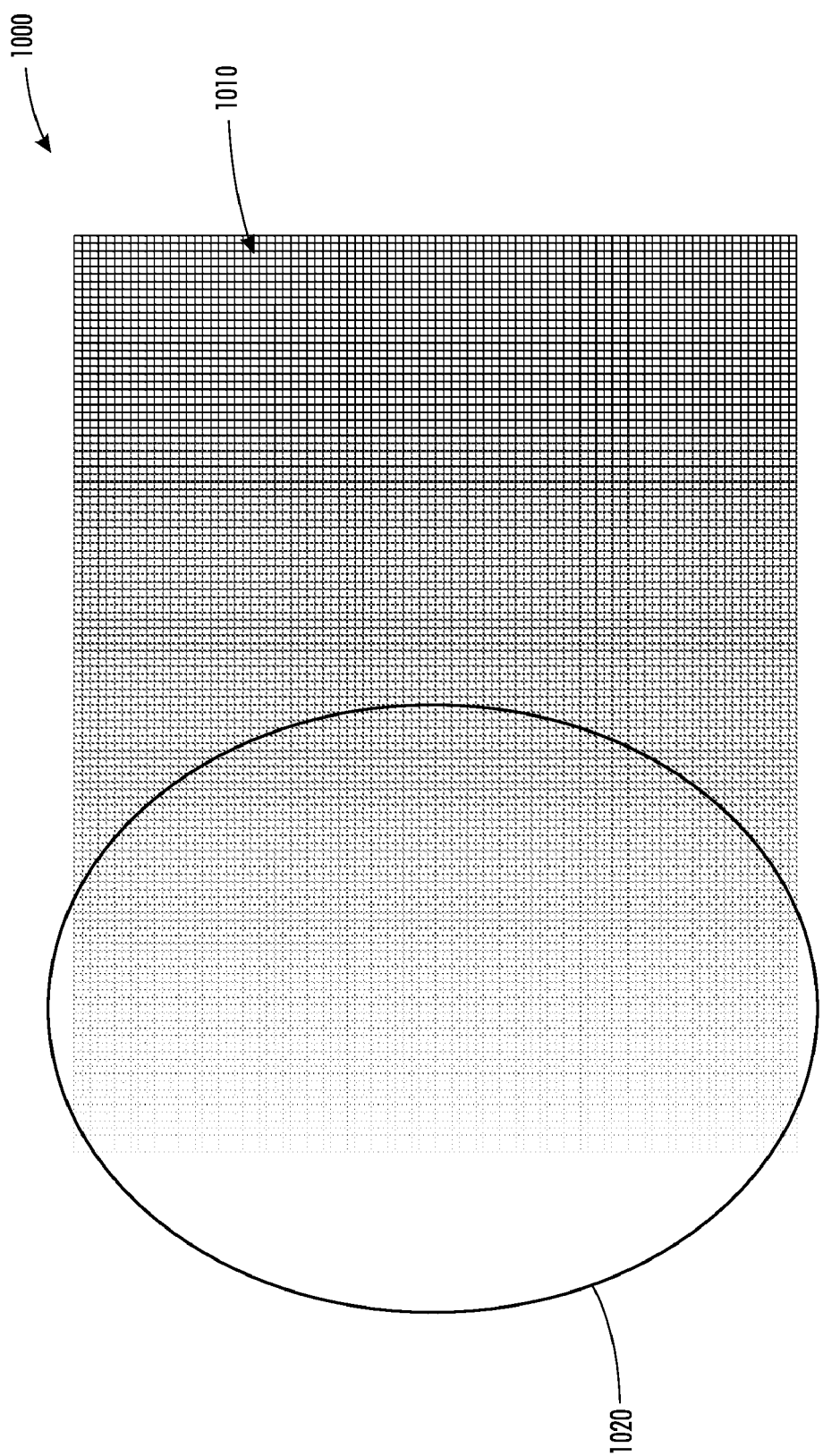
Figure 11:
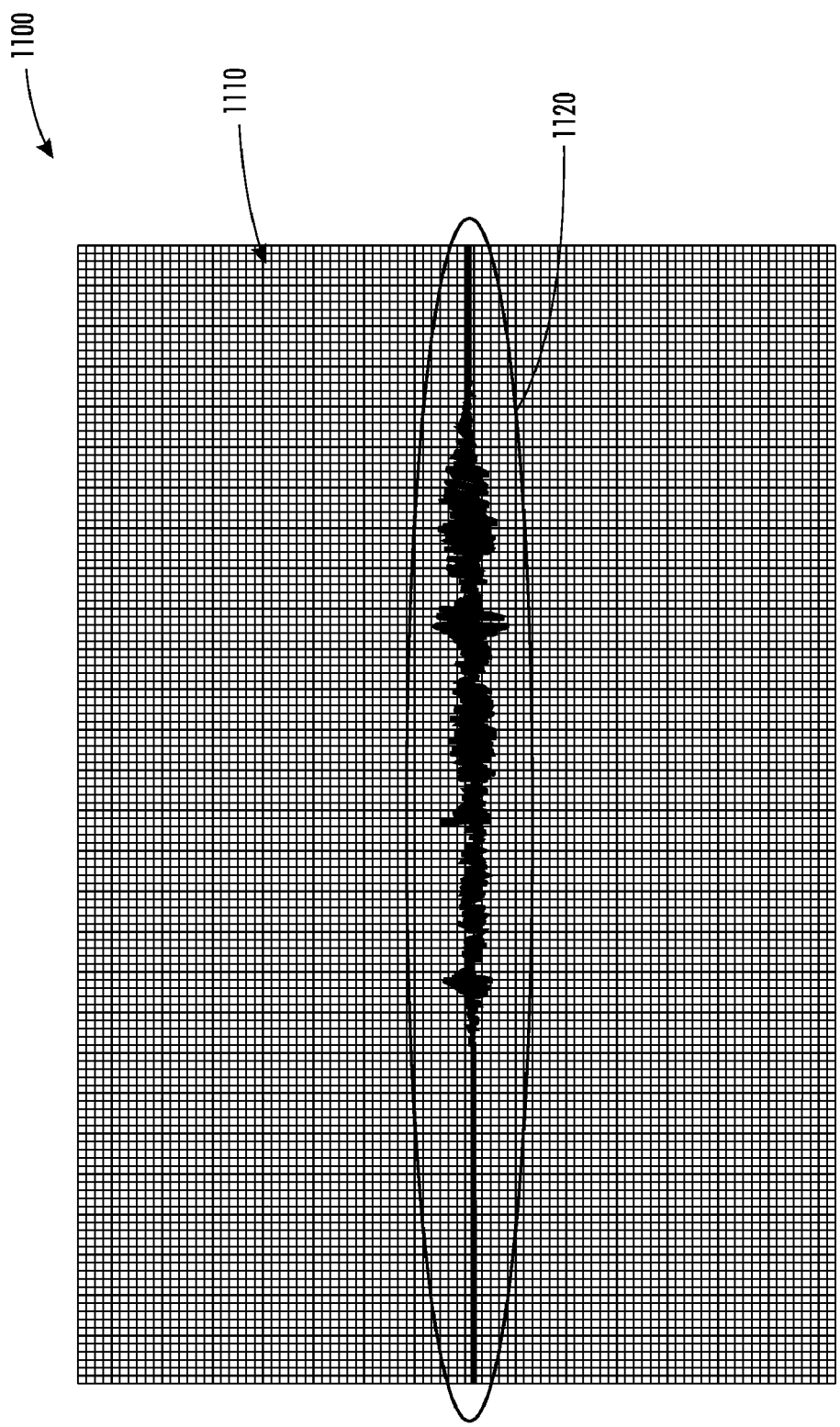

FIG. 10 (1000) shows the processed image 1010 having a portion with variable lightness 1020 of the lines. In contrast, FIG. 11 (1100) shows the processed image 1110 with a portion of the lines having variable darkness 1120. The method 100, the image detection software program 210, and the set of machine-readable instructions 212 disclosed herein may detect conditions of variable lightness 1020 and variable darkness 1120 using the comparisons between the processed image and the original image.

Figure 12:
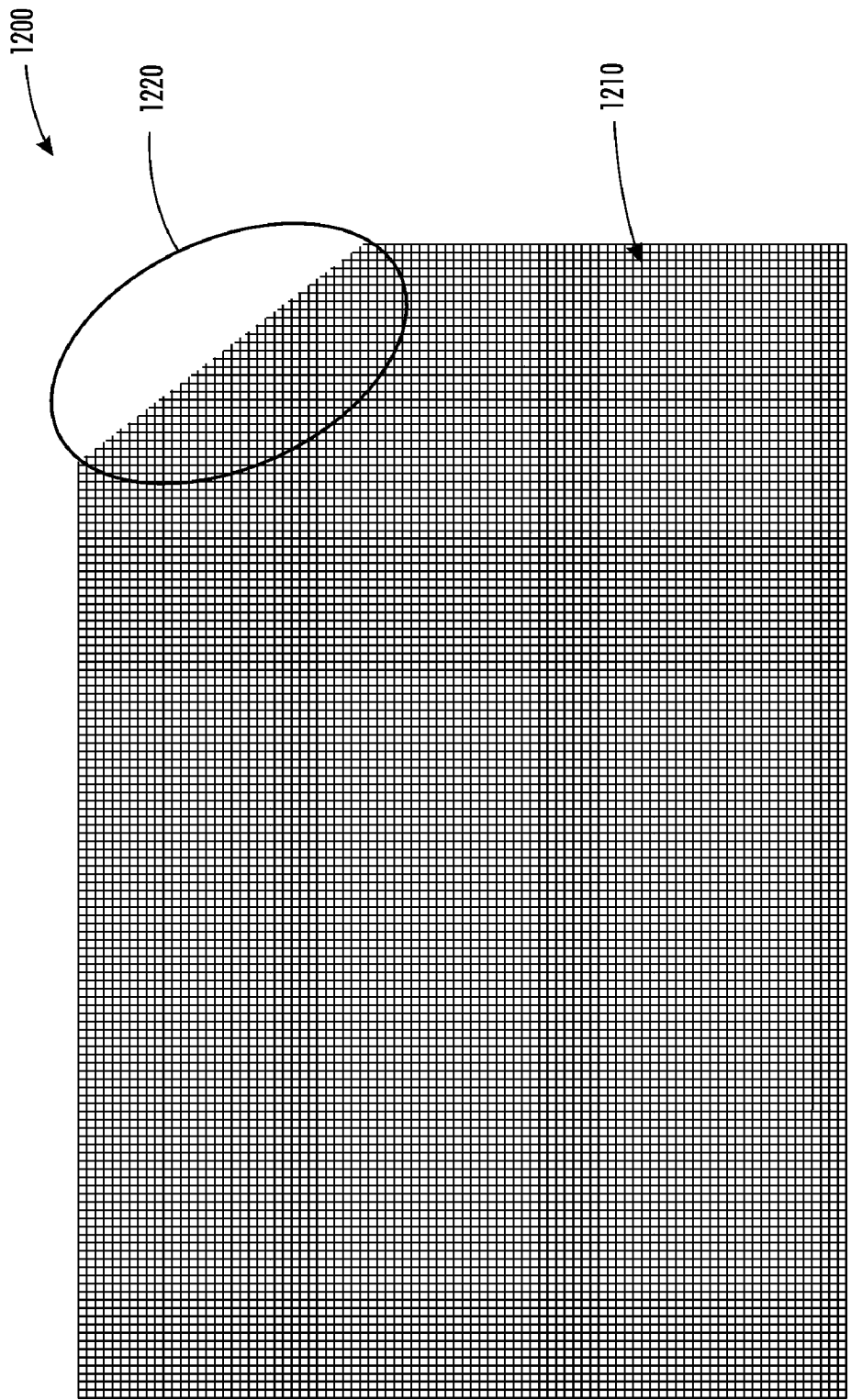

With reference to FIG. 12 (1200), the processed image 1210 is shown with a corner portion 1220 missing. The method 100, the image detection software program 210, and the set of machine-readable instructions 212 disclosed herein may be configured to identify missing portions, such as, missing corner portions 1220 of the processed image 1210 by comparing the vertical and/or horizontal distances between each of the plurality of intersection coordinates and providing vertical and/or horizontal line spacing results for each comparison based on the set of tolerance parameters.

Figure 13:
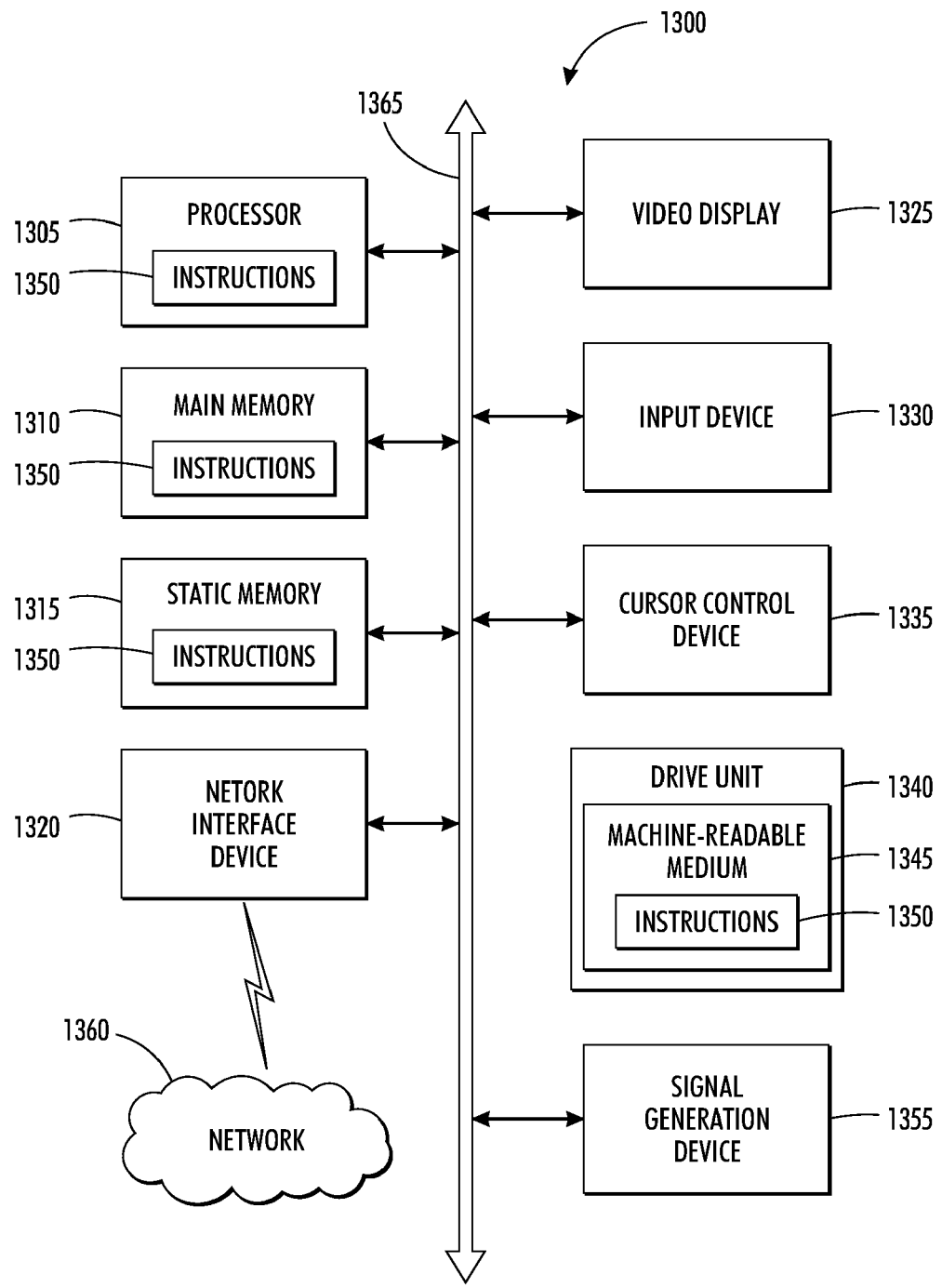
FIG. 13 shows a computer system configured to perform the method of FIG. 1.

FIG. 13 is a block diagram of a general computer system 1300. The computer system 1300 can include a set of instructions that can be executed to cause the computer system 1300 to perform any one or more of the methods or computer based functions disclosed herein with respect to FIGS. 1-12. The computer system 1300, or any portion thereof, may operate as a standalone device or may be connected, e.g., using a network 1360, to other computer systems or devices disclosed herein with respect to FIGS. 1-12. For example, the computer system 1300 may include or be included within any one or more of the method, system, networks, or any other devices disclosed herein with respect to FIGS. 1-12.

In a networked deployment, the computer system 1300 may operate in the capacity of a server or a client machine in a server-client network environment, or a peer machine in a peer-to-peer (or distributed) network environment. The computer system 1300 can also be implemented as or incorporated into various devices, such as an image processing device, a personal computer (PC), a tablet PC, a personal digital assistant (PDA), a web appliance, a communications device, a mobile device, a wireless telephone, a control system, a network router, switch or bridge, or any other machine capable of executing a set of instructions (sequential or otherwise) that specify actions to be taken by that machine. Further, while a single computer system 1300 is illustrated, the term "system" shall also be taken to include any collection of systems or sub-systems that individually or jointly execute a set, or multiple sets, of instructions to perform one or more computer functions.

As illustrated in FIG. 13, the computer system 1300 may include a processor 1305, e.g., a central processing unit (CPU), a graphics-processing unit (GPU), or both. Moreover, the computer system 1300 can include a main memory 1310 and a static memory 1315 that can communicate with each other via a bus 1365. As shown, the computer system 1300 may further include a video display unit 1325, such as a liquid crystal display (LCD), an organic light emitting diode (OLED), a flat panel display, a solid state display, or a cathode ray tube (CRT). Additionally, the computer system 1300 may include an input device 1330, such as a keyboard, and a cursor control device 1335, such as a mouse. The computer system 1300 can also include a disk drive unit 1340, a signal generation device 1355, such as a speaker or remote control, and a network interface device 1320.

In a particular embodiment, as depicted in FIG. 13, the disk drive unit 1340 may include a machine or computer-readable medium 1345 in which one or more sets of instructions 1350 (e.g., software) can be embedded. Further, the instructions 1350 may embody one or more of the methods or logic as described herein with reference to FIGS. 1-12. In a particular embodiment, the instructions 1350 may reside completely, or at least partially, within the main memory 1310, the static memory 1315, and/or within the processor 1305 during execution by the computer system 1300. The main memory 1310 and the processor 1305 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with the various embodiments, the methods described herein may be implemented by software programs that may be tangibly embodied in a processor-readable medium and that may be executed by a processor. Further, in an example, non-limited embodiment, implementations can include distributed processing, component/object distributed processing, and parallel processing. Alternatively, virtual computer system processing can be constructed to implement one or more of the methods or functionality as described herein.

While the machine-readable medium 1345 is shown to be a single medium, the term "machine-readable medium" includes a single medium or multiple media, such as a centralized or distributed database, and/or associated caches and servers that store one or more sets of instructions. The term "machine-readable medium" shall also include any medium that is capable of storing, encoding or carrying a set of instructions for execution by a processor or that cause a computer system to perform any one or more of the methods or operations disclosed herein.

In a particular non-limiting, example embodiment, the machine-readable medium 1345 can include a solid-state memory, such as, a memory card or other package that houses one or more non-volatile read-only memories. Further, the machine-readable medium 1345 can be a random access memory or other volatile re-writable memory. Additionally, the machine-readable medium 1345 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a machine-readable medium 1345 or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software which implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein and other equivalents and successor media, in which the software implementations herein may be stored.

Using the system, method, and machine-readable medium provided herein enables delivery of a higher quality processed image products and avoids penalties for converting original images to processed image products incorrectly. Moreover, the system, method, and computer readable medium provided herein takes quality assurance of images to a higher level without introducing extra labor and extra costs in the process.

It will be appreciated that various of the above-disclosed and other features and functions, or alternative thereof, may be desirably combined into many other different systems or applications. Various presently unforeseen or unanticipated alternatives, modifications, variations, or improvements therein may be subsequently made by those skilled in the art which are also intended to be encompassed by the following claims. In addition, the claims can encompass embodiments in hardware, software, or a combination thereof.

What is claimed is:

1. A system for detecting changes in images comprising:
a computing device configured to receive an original grid representing an original image; and
an image detection software program, said image detection software program for detecting changes between said original image and a processed image by:
receiving a description of said original grid, said description including a plurality of original grid line intersection coordinates associated therewith;
receiving said processed image and a set of tolerance parameters associated therewith, said processed image being represented as pixels, said set of tolerance parameters including a predefined vertical tolerance and a predefined horizontal tolerance;
scanning horizontally the pixels of said processed image into horizontal runs, the horizontal runs determining a plurality of vertical coordinates of said processed image, saving each of said plurality of vertical coordinates within said predefined vertical tolerance;
scanning vertically the pixels of said processed image into vertical runs, the vertical runs determining a plurality of horizontal coordinates of said processed image, saving each of the horizontal coordinates within said predefined horizontal tolerance;
determining a plurality of processed intersection coordinates, said plurality of processed intersection coordinates being determined by calculating the intersections of each of the saved plurality of horizontal and vertical coordinates;
comparing a portion of the plurality of processed intersection coordinates to a portion of the plurality of original grid line intersection coordinates; and
providing an image comparison result of the comparison of the plurality of processed intersection coordinates and the plurality of original grid line intersection coordinates.

2. The system of claim 1, further comprising an image processing device configured to receive an original image and to prepare a processed image based on said original image, said image processing device connectable to said image detection software program.

3. The system of claim 2, further comprising a scanning device configured to scan said original image and provide the scanned original image as said processed image to said image detection software program, said scanning device connectable to said image processing device.

4. The system of claim 2, further comprising one or more input devices configured to receive input for one or more of the following: said description of said original grid; said processed image, and said set of tolerance parameters.

5. The system of claim 2, further comprising one or more memory devices for storing one or more of said description of said original grid, said processed image, said set of tolerance parameters, said plurality of vertical coordinates, said plurality of horizontal coordinates, said plurality of processed intersection coordinates, and said plurality of original grid line intersection coordinates.

6. The system of claim 1, wherein said image detection software program compares said portion of the plurality of processed intersection coordinates to said portion of said plurality of original grid line intersection coordinates by:
comparing the distance between each of said plurality of processed intersection coordinates to each said plurality of original grid line intersection coordinates associated with said description of said original grid; and
determining a spacing result for each comparison based on said set of tolerance parameters.

7. The system of claim 1, wherein said image detection software program calculates a processed image outer rectangle of said plurality of processed intersection coordinates representing the outer edges of said processed image by:
  determining a first processed edge of said processed image outer rectangle using the plurality of processed intersection coordinates to select the processed intersection coordinates having the smallest y-value coordinates to form one of the vertical edges of said processed image outer rectangle;
  determining a second processed edge of said processed image outer rectangle using the plurality of processed intersection coordinates to select the processed intersection coordinates having the largest y-value coordinates to form the other of the vertical edges of said processed image outer rectangle;
  determining a third processed edge of said processed image outer rectangle using the plurality of processed intersection coordinates to select the processed intersection coordinates having the smallest x-value coordinates to form one of the horizontal edges of said processed image outer rectangle; and
  determining a fourth processed edge of said processed image outer rectangle using the plurality of processed intersection coordinates to select the processed intersection coordinates having the largest x-value coordinates to form the other of the horizontal edges of said processed image outer rectangle.

8. The system of claim 7, further comprising:
comparing said processed image outer rectangle to said original grid outer rectangle by:
  comparing each of said plurality of processed intersection coordinates of said first processed edge of said processed image outer rectangle to said plurality of original grid line intersection coordinates forming a first vertical edge of an original grid outer rectangle having the smallest y-value coordinates;
  comparing each of said plurality of processed intersection coordinates of said second processed edge of said processed image outer rectangle to said plurality of original grid line intersection coordinates forming a second vertical edge of said original grid outer rectangle having the largest y-value coordinates;
  comparing each of said plurality of processed intersection coordinates of said third processed edge of said processed image outer rectangle to said plurality of original grid line intersection coordinates forming a first horizontal edge of an original outer rectangle having the smallest x-value coordinates;
  comparing each of said plurality of processed intersection coordinates of said fourth processed edge of said processed image outer rectangle to said plurality of original grid line intersection coordinates forming a second horizontal edge of an original outer rectangle having the largest x-value coordinates; and
  determining an outer rectangle result based on the result of the comparison of the plurality of processed image intersection coordinates to the plurality of original grid line intersection coordinates and said set of tolerance parameters.

9. The system of claim 7, further comprising:
calculating a skew value for one or more of said first processed edge of said processed image outer rectangle, said second processed edge of said processed image outer rectangle, said third processed edge of said processed image outer rectangle, and said fourth processed edge of said processed image outer rectangle; and
  determining a skew result for each of the one or more calculated skew values based on said set of tolerance parameters.

10. The system of claim 7, further comprising:
calculating the length of one or more of said first processed edge of said processed image outer rectangle, said second processed edge of said processed image outer rectangle, said third processed edge of said processed image outer rectangle, and said fourth processed edge of said processed image outer rectangle;
comparing the calculated length of said one or more of said first processed edge of said processed image outer rectangle, said second processed edge of said processed image outer rectangle, said third processed edge of said processed image outer rectangle, and said fourth processed edge of said processed image outer rectangle to said description of one or more of a first vertical edge of an original grid outer rectangle having the smallest y-value coordinates, a second vertical edge of said original grid outer rectangle having the largest y-value coordinates, a first horizontal edge of an original outer rectangle having the smallest x-value coordinates, and a second horizontal edge of an original outer rectangle having the largest x-value coordinates corresponding to the calculated length of said one or more of said first processed edge of said processed image outer rectangle, said second processed edge of said processed image outer rectangle, said third processed edge of said processed image outer rectangle, and said fourth processed edge of said processed image outer rectangle; and
determining an edge comparison result for each comparison of the calculated lengths based on the set of tolerance parameters.

11. A method for detecting changes in images comprising:
receiving, with a computing device, a description of an original grid representing an original image, said description including a plurality of original grid line intersection coordinates associated therewith;
receiving, with said computing device, a processed image and a set of tolerance parameters associated therewith, said processed image being represented as pixels, said set of tolerance parameters including a predefined vertical tolerance and a predefined horizontal tolerance;
scanning horizontally the pixels of said processed image into horizontal runs, the horizontal runs determining a plurality of vertical coordinates of said processed image, saving each of said plurality of vertical coordinates within said predefined vertical tolerance;
scanning vertically the pixels of said processed image into vertical runs, the vertical runs determining a plurality of horizontal coordinates of said processed image, saving each of the horizontal coordinates within said predefined horizontal tolerance;
determining a plurality of processed intersection coordinates, said plurality of processed intersection coordinates being determined by calculating the intersections of each of the saved plurality of horizontal and vertical coordinates;
comparing a portion of the plurality of processed intersection coordinates to a portion of the plurality of original grid line intersection coordinates; and
providing an image comparison result of the comparison of the plurality of processed intersection coordinates and the plurality of original grid line intersection coordinates.

12. The method of claim 11, further comprising receiving, with said computing device, a scanned version of said original image, the scanned version of said original image being provided as said proceeded image.

13. The method of claim 11, further comprising receiving, with said computing device, input from an input device, the input including: said description of said original grid; said processed image, and said set of tolerance parameters.

14. The method of claim 11, further comprising storing, in one or more memory devices, one or more of said description of said original grid, said processed image, said set of tolerance parameters, said plurality of vertical coordinates, said plurality of horizontal coordinates, said plurality of processed intersection coordinates, and said plurality of original grid line intersection coordinates.

15. The method of claim 11, wherein comparing said portion of the plurality of processed intersection coordinates to said portion of said plurality of original grid line intersection coordinates includes:
   comparing, with an image detection software program, the distance between each of said plurality of processed intersection coordinates to each said plurality of original grid line intersection coordinates associated with said description of said original grid; and
   determining a spacing result for each comparison based on said set of tolerance parameters.

16. The method of claim 11, further comprising calculating, with an image detection software program, a processed image outer rectangle of said plurality of processed intersection coordinates representing the outer edges of said processed image by:
   determining a first processed edge of said processed image outer rectangle using the plurality of processed intersection coordinates to select the processed intersection coordinates having the smallest y-value coordinates to form one of the vertical edges of said processed image outer rectangle;
   determining a second processed edge of said processed image outer rectangle using the plurality of processed intersection coordinates to select the processed intersection coordinates having the largest y-value coordinates to form the other of the vertical edges of said processed image outer rectangle;
   determining a third processed edge of said processed image outer rectangle using the plurality of processed intersection coordinates to select the processed intersection coordinates having the smallest x-value coordinates to form one of the horizontal edges of said processed image outer rectangle; and
   determining a fourth processed edge of said processed image outer rectangle using the plurality of processed intersection coordinates to select the processed intersection coordinates having the largest x-value coordinates to form the other of the horizontal edges of said processed image outer rectangle.

17. The method of claim 16, further comprising:
   comparing said processed image outer rectangle to said original grid outer rectangle by:
      comparing each of said plurality of processed intersection coordinates of said first processed edge of said processed image outer rectangle to said plurality of original grid line intersection coordinates forming a first vertical edge of an original grid outer rectangle having the smallest y-value coordinates;
      comparing each of said plurality of processed intersection coordinates of said second processed edge of said processed image outer rectangle to said plurality of original grid line intersection coordinates forming a second vertical edge of said original grid outer rectangle having the largest y-value coordinates;
      comparing each of said plurality of processed intersection coordinates of said third processed edge of said processed image outer rectangle to said plurality of original grid line intersection coordinates forming a first horizontal edge of an original outer rectangle having the smallest x-value coordinates;
      comparing each of said plurality of processed intersection coordinates of said fourth processed edge of said processed image outer rectangle to said plurality of original grid line intersection coordinates forming a second horizontal edge of an original outer rectangle having the largest x-value coordinates; and
   determining an outer rectangle result based on the result of the comparison of the plurality of processed image intersection coordinates to the plurality of original grid line intersection coordinates and said set of tolerance parameters.

18. The method of claim 16, further comprising:
   calculating the length of one or more of said first processed edge of said processed image outer rectangle, said second processed edge of said processed image outer rectangle, said third processed edge of said processed image outer rectangle, and said fourth processed edge of said processed image outer rectangle;
   comparing the calculated length of said one or more of said first processed edge of said processed image outer rectangle, said second processed edge of said processed image outer rectangle, said third processed edge of said processed image outer rectangle, and said fourth processed edge of said processed image outer rectangle to said description of one or more of a first vertical edge of an original grid outer rectangle having the smallest y-value coordinates, a second vertical edge of said original grid outer rectangle having the largest y-value coordinates, a first horizontal edge of an original outer rectangle having the smallest x-value coordinates, and a second horizontal edge of an original outer rectangle having the largest x-value coordinates corresponding to the calculated length of said one or more of said first processed edge of said processed image outer rectangle, said second processed edge of said processed image outer rectangle, said third processed edge of said processed image outer rectangle, and said fourth processed edge of said processed image outer rectangle; and
   determining an edge comparison result for each comparison of the calculated lengths based on the set of tolerance parameters.

19. The method of claim 16, further comprising:
   calculating a skew value for one or more of said first processed edge of said processed image outer rectangle, said second processed edge of said processed image outer rectangle, said third processed edge of said processed image outer rectangle, and said fourth processed edge of said processed image outer rectangle; and
   determining a skew result for each of the one or more calculated skew values based on said set of tolerance parameters.

20. A non-transitory machine-readable storage medium comprising operational instructions that, when executed by a processor, cause the processor to:
   receive a description of an original grid representing an original image, said description including a plurality of original grid line intersection coordinates associated therewith;

receive a processed image and a set of tolerance parameters associated therewith, said processed image being represented as pixels, said set of tolerance parameters including a predefined vertical tolerance and a predefined horizontal tolerance;

scan horizontally the pixels of said processed image into horizontal runs, the horizontal runs determining a plurality of vertical coordinates of said processed image, saving each of said plurality of vertical coordinates within said predefined vertical tolerance;

scan vertically the pixels of said processed image into vertical runs, the vertical runs determining a plurality of horizontal coordinates of said processed image, saving each of the horizontal coordinates within said predefined horizontal tolerance;

determine a plurality of processed intersection coordinates, said plurality of processed intersection coordinates being determined by calculating the intersections of each of the saved plurality of horizontal and vertical coordinates;

compare a portion of the plurality of processed intersection coordinates to a portion of the plurality of original grid line intersection coordinates; and provide an image comparison result of the comparison of the plurality of processed intersection coordinates and the plurality of original grid line intersection coordinates.

21. The machine-readable storage medium of claim 20, further comprising instructions for an image detection software program to receive a scanned version of said original image, the scanned version of said original image being provided as said proceeded image.

22. The machine-readable storage medium of claim 20, further comprising instructions for an image detection software program to receive input from an input device, the input including: said description of said original grid; said processed image, and said set of tolerance parameters.

23. The machine-readable storage medium of claim 20, further comprising instructions for storing, in one or more memory devices, one or more of said description of said original grid, said processed image, said set of tolerance parameters, said plurality of vertical coordinates, said plurality of horizontal coordinates, said plurality of processed intersection coordinates, and said plurality of original grid line intersection coordinates.

24. The machine-readable storage medium of claim 20, further comprising instructions for comparing said portion of the plurality of processed intersection coordinates to said portion of said plurality of original grid line intersection coordinates, said instructions including:

comparing the distance between each of said plurality of processed intersection coordinates to each said plurality of original grid line intersection coordinates associated with said description of said original grid; and determining a spacing result for each comparison based on said set of tolerance parameters.

25. The machine-readable storage medium of claim 20, further comprising instructions for calculating a processed image outer rectangle of said plurality of processed intersection coordinates representing the outer edges of said processed image by:

determining a first processed edge of said processed image outer rectangle using the plurality of processed intersection coordinates to select the processed intersection coordinates having the smallest y-value coordinates to form one of the vertical edges of said processed image outer rectangle;

determining a second processed edge of said processed image outer rectangle using the plurality of processed intersection coordinates to select the processed intersection coordinates having the largest y-value coordinates to form the other of the vertical edges of said processed image outer rectangle;

determining a third processed edge of said processed image outer rectangle using the plurality of processed intersection coordinates to select the processed intersection coordinates having the smallest x-value coordinates to form one of the horizontal edges of said processed image outer rectangle; and determining a fourth processed edge of said processed image outer rectangle using the plurality of processed intersection coordinates to select the processed intersection coordinates having the largest x-value coordinates to form the other of the horizontal edges of said processed image outer rectangle.

26. The machine-readable storage medium of claim 25, further comprising instructions for comparing said processed image outer rectangle to said original grid outer rectangle by:

comparing each of said plurality of processed intersection coordinates of said first processed edge of said processed image outer rectangle to said plurality of original grid line intersection coordinates forming a first vertical edge of an original grid outer rectangle having the smallest y-value coordinates;

comparing each of said plurality of processed intersection coordinates of said second processed edge of said processed image outer rectangle to said plurality of original grid line intersection coordinates forming a second vertical edge of said original grid outer rectangle having the largest y-value coordinates;

comparing each of said plurality of processed intersection coordinates of said third processed edges of said processed image outer rectangle to said plurality of original grid line intersection coordinates forming a first horizontal edge of an original outer rectangle having the smallest x-value coordinates;

comparing each of said plurality of processed intersection coordinates of said fourth processed edges of said processed image outer rectangle to said plurality of original grid line intersection coordinates forming a second horizontal edge of an original outer rectangle having the largest x-value coordinates; and determining an outer rectangle result based on the result of the comparison of the plurality of processed image intersection coordinates to the plurality of original grid line intersection coordinates and said set of tolerance parameters.

27. The machine-readable storage medium of claim 25, further comprising instructions for:

calculating a skew value for one or more of said first processed edge of said processed image outer rectangle, said second processed edge of said processed image outer rectangle, said third processed edge of said processed image outer rectangle, and said fourth processed edge of said processed image outer rectangle; and determining a skew result for each of the one or more calculated skew values based on said set of tolerance parameters.

28. The machine-readable storage medium of claim 25, further comprising instructions for:

calculating the length of one or more of said first processed edge of said processed image outer rectangle, said second processed edge of said processed image outer rectangle, said third processed edge of said processed image outer rectangle, and said fourth processed edge of said processed image outer rectangle;

comparing the calculated length of said one or more of said first processed edge of said processed image outer rectangle, said second processed edge of said processed image outer rectangle, said third processed edge of said processed image outer rectangle, and said fourth processed edge of said processed image outer rectangle to said description of one or more of a first vertical edge of an original grid outer rectangle having the smallest y-value coordinates, a second vertical edge of said original grid outer rectangle having the largest y-value coordinates, a first horizontal edge of an original outer rectangle having the smallest x-value coordinates, and a second horizontal edge of an original outer rectangle having the largest x-value coordinates corresponding to the calculated length of said one or more of said first processed edge of said processed image outer rectangle, said second processed edge of said processed image outer rectangle, said third processed edge of said processed image outer rectangle, and said fourth processed edge of said processed image outer rectangle; and determining an edge comparison result for each comparison of the calculated lengths based on the set of tolerance parameters.

* * * * *